United States Patent [19]
Harada et al.

[11] Patent Number: 5,266,278
[45] Date of Patent: Nov. 30, 1993

[54] HONEYCOMB HEATER HAVING INTEGRALLY FORMED ELECTRODES AND/OR INTEGRALLY SINTERED ELECTRODES AND METHOD OF MANUFACTURING SUCH HONEYCOMB HEATER

[75] Inventors: Takashi Harada, Nagoya; Fumio Abe, Handa; Hiroshige Mizuno, Tajimi, all of Japan

[73] Assignee: NGK Insulators, Ltd., Japan

[21] Appl. No.: 968,670

[22] Filed: Oct. 30, 1992

Related U.S. Application Data

[63] Continuation of Ser. No. 581,985, Sep. 14, 1990, Pat. No. 5,200,154.

[30] Foreign Application Priority Data

Jul. 6, 1990 [JP] Japan .................. 2-178529

[51] Int. Cl.$^5$ .............. F01N 3/10; B01D 53/36; H05B 3/10
[52] U.S. Cl. ................. 422/174; 422/173; 422/177; 422/180; 219/541; 219/553; 55/523; 55/DIG. 30; 60/300; 392/488
[58] Field of Search .............. 422/174, 175, 177, 179, 422/180; 219/541, 542, 552, 553, 205; 392/347, 379, 485, 486, 488, 490, 502; 55/523, DIG. 30; 60/300

[56] References Cited

U.S. PATENT DOCUMENTS

| | | | |
|---|---|---|---|
| 2,903,666 | 9/1959 | Krellner | 338/330 |
| 3,927,300 | 12/1975 | Wada et al. | 392/502 |
| 3,956,614 | 5/1976 | Hervert | 219/541 |
| 4,449,039 | 5/1984 | Fukazawa et al. | 219/553 |
| 4,450,823 | 5/1984 | Abe et al. | 123/549 |
| 4,654,510 | 3/1987 | Umeya et al. | 219/541 |
| 4,723,069 | 2/1988 | Hoshizaki et al. | 219/521 |
| 4,955,129 | 9/1990 | McCauley et al. | 29/611 |
| 4,976,929 | 12/1990 | Cornelison et al. | 422/174 |
| 5,062,911 | 11/1991 | Hampton et al. | 156/89 |

FOREIGN PATENT DOCUMENTS

| | | |
|---|---|---|
| 2410999 | 9/1974 | Fed. Rep. of Germany . |
| 2432904 | 2/1975 | Fed. Rep. of Germany . |
| 63-67609 | 5/1988 | Japan . |
| 61-161599 | 5/1988 | Japan . |
| 2049377A | 12/1980 | United Kingdom . |
| WO89/10471 | 11/1989 | World Int. Prop. O. . |

OTHER PUBLICATIONS

Japanese Patents Gazette, Week 8105, Derwent Publications, Ltd., London, GB; AN 81-0668D & JP-A-55 151 301 (Nichison), Nov. 26, 1981.

*Primary Examiner*—Robert J. Warden
*Assistant Examiner*—T. A. Trembley
*Attorney, Agent, or Firm*—Parkhurst, Wendel & Rossi

[57] ABSTRACT

A honeycomb heater having integrally formed and/or integrally sintered electrodes constructed of a metallic honeycomb structure having a desired honeycomb configuration, and metallic electrodes which are integrally sintered with the honeycomb structure at predetermined positions thereon. The honeycomb heater having integrally sintered electrodes is manufactured by joining or contacting the electrode-like formed bodies to the formed honeycomb body, and then by sintering the formed honeycomb body with the electrode-like formed bodies attached or contacted thereto. The electrodes are made of the same material as that of the honeycomb body, or of a material having an electric resistance lower than that of the material comprising the honeycomb body. Alternatively, the honeycomb heater having integrally formed and integrally sintered electrodes is manufactured by preparing an extrusion of a honeycomb body as one body which has a honeycomb configuration and an electrode-like shape at predetermined positions thereon, and then sintering that formed honeycomb body.

3 Claims, 1 Drawing Sheet

HONEYCOMB HEATER HAVING INTEGRALLY FORMED ELECTRODES AND/OR INTEGRALLY SINTERED ELECTRODES AND METHOD OF MANUFACTURING SUCH HONEYCOMB HEATER

This is a continuation of application Ser. No. 07/581,985 filed Sep. 14, 1990 now U.S. Pat. No. 5,200,154.

BACKGROUND OF THE INVENTION

1. Field of the Invention

The present invention relates to a honeycomb heater having integrally formed and/or sintered electrodes and employing a honeycomb structure, and a method of manufacturing such a honeycomb heater.

2. Description of the Related Art

Conventionally, porous ceramic honeycomb structures have been employed as catalysts or substrates for catalysts which remove, for example, nitrogen oxides, in the exhaust gas of internal combustion engines, such as automobiles.

In recent years, there has been a desire to develop materials exhibiting greater mechanical strength and thermal resistance in hostile environments. To these ends, honeycomb structures manufactured by forming metal powders and then sintering the formed body have been put into practical use.

The present inventors have already proposed in U.S. patent application Ser. Nos. 07/545,509, now U.S. Pat. No. 5,63,029, and 07/545,697, now abandoned, a honeycomb heater which is comprised of a honeycomb structure with electrodes formed thereon to supply an electric current to the honeycomb structure. This honeycomb structure is produced by forming ceramic or metal powders into a desired honeycomb configuration and then sintering the formed honeycomb body.

In the above-described honeycomb heater, the electrodes are mounted on the outer peripheral wall or inside of the honeycomb structure by the conventional welding or brazing.

However, in the case where the electrodes are mounted on the outer peripheral wall of the honeycomb structure by welding, the portion of the thin outer peripheral wall of the honeycomb structure on which the electrodes are mounted is subjected to heat generated by the welding and may thus be damaged. Brazing requires a large number of manhours and is expensive. Furthermore, in the above-described honeycomb heater, since the electrodes are joined to the sintered honeycomb structure, the joined portions are exposed to heat in the exhaust gas during the use, deteriorating the durability of the honeycomb heater.

SUMMARY OF THE INVENTION

An object of the present invention is to provide a honeycomb heater having integrally formed and/or integrally sintered electrodes which eliminates the aforementioned problems associated with the above-mentioned techniques, and to provide a method of manufacturing such a honeycomb heater.

To this end, the present invention provides a honeycomb heater having integrally formed and sintered electrodes which comprises a honeycomb structure having a desired honeycomb configuration, and electrodes which are integrally formed with the honeycomb structure at predetermined positions thereon. The electrodes are made of the same material as that of the honeycomb structure or of a material having an electric resistance lower than that of the material comprising the honeycomb structure.

The present invention also provides a method of manufacturing a honeycomb heater having integrally sintered electrodes by powder metallurgy. This method of manufacturing comprises the steps of preparing a formed honeycomb body by forming raw material powders into a desired honeycomb configuration and preparing electrode-like formed bodies made of the same material as that of the formed honeycomb body or of a material having an electric resistance lower than that of the material of the formed honeycomb body. The electrode-like formed bodies are then joined to the formed honeycomb body at predetermined positions and the resulting formed honeycomb body with the electrode-like formed bodies joined thereto is sintered together.

The present invention further provides a method of manufacturing a honeycomb heater having integrally formed and sintered electrodes by powder metallurgy. This manufacturing method comprises the steps of preparing a formed honeycomb body as one body which has an electrode-like shape at predetermined positions by forming raw material powders into a honeycomb configuration having a large number of passages, and then sintering the resultant formed body.

DETAILED DESCRIPTION OF THE INVENTION

Figure 1:
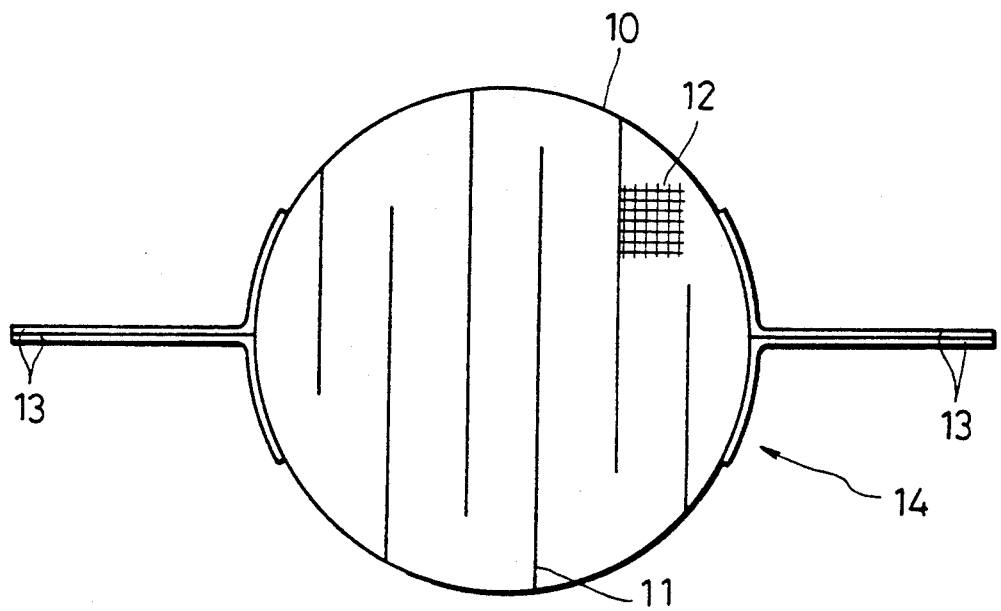
FIG. 1 is a plan view of an example of a honeycomb structure manufactured in the present invention.

In the first aspect of the present invention, the honeycomb heater is manufactured by joining or contacting the electrode-like formed bodies to the formed honeycomb body, and then by sintering the formed honeycomb body with the electrode-like formed bodies attached or contacted thereto. The electrodes are made of the same material as that of the honeycomb body, or of a material having an electric resistance lower than that of the material comprising the honeycomb body.

In the second aspect of the present invention, the honeycomb heater is manufactured by preparing a honeycomb body as one body which has a honeycomb configuration and which has an electrode-like shape at predetermined positions thereon by extrusion or the like, and then sintering that formed honeycomb body.

Thus, honeycomb heaters having integrally formed electrodes at predetermined positions on the honeycomb structure can be effectively manufactured without damaging the honeycomb structure. In this case, the electrodes are made of the same material as that of the honeycomb structure, or a material having an electric resistance lower than that comprising the honeycomb structure. Furthermore, since the portion of the honeycomb structure joined to the electrodes is continuous in terms of material, the resultant honeycomb heater exhibits excellent durability in high-temperature environments.

Whereas any material, ceramic or metal, capable of generating heat when energized, can be used as the material of the honeycomb heater, the use of metal enhances the mechanical strength and is thus preferred.

Examples of such metals include stainless steel and materials having compositions of Fe-Cr-Al, Fe-Cr, Fe-Al, Fe-Ni, W-Co, and Ni-Cr. Among the above materials, Fe-Cr-Al, Fe-Cr and Fe-Al are preferred because of low cost and high resistance to heat, oxidation and corrosion.

The honeycomb structure employed in the present invention may be porous or non-porous. In the case where a catalyst is carried on the honeycomb structure, however, a porous honeycomb structure is preferred because a catalyst layer can closely adhere to such a honeycomb structure, and does not peel from the honeycomb structure even when a difference in the thermal expansion between the honeycomb structure and the catalyst exists.

The metal honeycomb body will be prepared in the manner described below. First, Fe powder, Al powder and Cr powder, or alternatively powders of alloys of these metals, are mixed to prepare a metal powder mixture having a desired composition. Subsequently, the metal powder mixture is blended into an organic binder, such as methyl cellulose or polyvinylalcohol, and water to produce a readily formable mixture. That mixture is then formed into a shape of a desired honeycomb configuration by extrusion, pressing or casting.

The thus-obtained formed honeycomb body may be of the form of a honeycomb body which is formed into a honeycomb configuration having a large number of passages and which has an electrode-like shape at predetermined positions thereon, or of a honeycomb body with electrode-like formed bodies joined to predetermined positions thereon.

In the latter case, the electrode-like formed bodies are made of the same material as that of the formed honeycomb body, or of a material having an electric resistance lower than that of the material of the formed honeycomb body. Such electrode-like formed bodies are prepared in the similar manner to that in which the honeycomb body is prepared.

Next, the formed honeycomb body which has an electrode-like shape at the predetermined positions thereon, or the formed honeycomb body with the electrode-like formed bodies joined to the predetermined positions thereon, is fired in a non-oxidizing atmosphere at a temperature ranging between 1000° and 1450° C. During the sintering in the non-oxidizing atmosphere containing hydrogen, the organic binder is decomposed and thereby removed with the aid of Fe or the like, which acts as a catalyst. A good sintered body (a honeycomb structure) can therefore be obtained.

Sintering is not adequate at a temperature lower than 1000° C. Sintering conducted at a temperature higher than 1450° C. causes deformation of the resulting sintered body and is thus undesirable.

Preferably, a heat-resistant metal oxide layer is then formed on the surface of the cell walls and the surface of the pores of the obtained honeycomb structure.

Next, a resistance adjusting mechanism of a desired form is provided on the obtained honeycomb structure between the electrodes thereof.

The resistance adjusting mechanism provided on the honeycomb structure may take on any of the following forms:

(1) a slit or slits of any length, formed in any direction at any position
(2) variations in the length of the cell walls in the axial direction of the passages
(3) variations in the thickness (wall thickness) of the cell walls of the honeycomb structure or variations in the cell density of the honeycomb structure, or
(4) a slit or slits formed in the cell wall (rib) of the honeycomb structure.

In the honeycomb heater having the integrally formed electrodes according to the present invention, the resistance thereof will be preferably held between 0.001 Ω and 0.5 Ω.

The term, "a formed honeycomb body" is employed in this application to refer to an integral body having a large number of passages partitioned by the walls. The passages may have any cross-sectional form (cell shape), e.g., a circular, polygonal or corrugated form.

The present invention will further be illustrated in the following examples which are intended to be illustrative, but not limiting, of this invention.

EXAMPLE 1

Fe powder, Fe-Cr powder, and Fe-Al powder were mixed to prepare a mixture having a composition of Fe-20Cr-5Al (% by weight), and the obtained mixture was then formed by the extrusion into a honeycomb body having an outer diameter of 105 mm$\phi$, a length of 20 mm, a rib thickness of 8 mil and square passages 12 at a passage density of 300 cells/in$^2$. The extruded honeycomb body was dried to obtain a honeycomb dried body 10 shown in FIG. 1. Next, four plates 13, each having a thickness 2 mm, a width of 20 mm and a length of 60 mm, were prepared by the extrusion using the same mixture. The formed plates 13 were attached to the honeycomb dried body 10 with two of them making one pair, as shown in FIG. 1.

A slurry of the mixture having the same composition was used as the adhesive. After the adhesion, the adhesive was dried to obtain a dried honeycomb heater having the integrally formed electrodes. Thereafter, the dried honeycomb heater having the integrally formed electrodes was fired in H$_2$ atmosphere at 1300° C. Thereafter, slits 11 were formed adequately, and a honeycomb heater 14 with the electrodes formed integrally thereon, having an outer diameter of 90 mm$\phi$ and a length of 17 mm, was thereby obtained.

EXAMPLE 2

Figure 2:
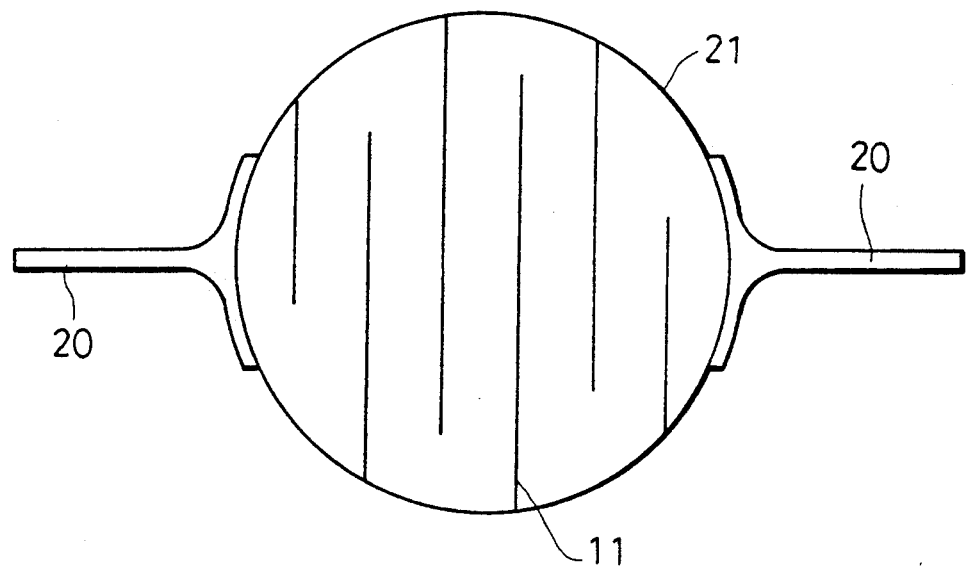
FIG. 2 is a plan view of another example of the honeycomb structure manufactured in the present invention.

The powder mixture having the same compositions as that of the powder mixture employed in Example 1 was formed into a shape of an electrode 20 shown in FIG. 2 by the powder pressing. The obtained electrodes 20 were attached to the same honeycomb dried body as that employed in Example 1 using as an adhesive a slurry obtained by mixing a binder and water to a powder mixture having the low electric resistance composition of Fe-20Cr-5Al-5Cu (% by weight). The adhesive was dried to obtain a dried honeycomb heater having the integrally formed electrodes. Thereafter, the dried honeycomb heater having the integrally formed electrodes was fired in H$_2$ atmosphere at 1300° C. Thereafter, slits 11 were formed appropriately, and a honeycomb heater 21 with electrodes formed integrally thereon was thereby obtained.

EXAMPLE 3

The powder mixture having the low electric resistance composition of Fe-20Cr-5Al-5Cu was formed into a shape of an electrode 20 shown in FIG. 2 by the powder pressing. The obtained electrodes 20 were attached to the same honeycomb dried body as that employed in Example 1 using as an adhesive a slurry obtained by mixing a binder and water to the same powder mixture as that used to form the electrodes 20. The adhesive was dried to obtain a dried honeycomb heater having the integrally formed electrodes. Thereafter, a honeycomb heater 21 having the integrally formed electrodes was manufactured under the same conditions as those of Example 2.

EXAMPLE 4

A honeycomb dried body was manufactured in the same manner as that of Example 1. A formable mixture body for manufacturing honeycomb configuration was cut into block-like shapes and these block-shaped bodies were dried. Thereafter, these dried bodies were each cut into a shape of the electrode shown in FIG. 2. Thereafter, a honeycomb heater having the integrally formed electrodes was obtained under the same conditions as those of Example 2.

EXAMPLE 5

The same powder mixture as that employed in Example 1 was formed into a honeycomb body which had an electrode-like shape at predetermined positions thereon using an extruder die capable of forming the whole body shown in FIG. 1. The obtained formed honeycomb body was dried and sintered. Thereafter the slits were formed adequately to obtain a honeycomb heater having the integrally formed electrodes.

EXAMPLE 6

A honeycomb heater having the integrally formed electrodes and a catalyst was produced by coating γ-alumina in which $CeCO_2$ was present in a proportion of 8 wt % on the honeycomb structure of the honeycomb heater having the integrally formed electrodes which was obtained in Example 1, by loading 20 g/ft³ of Pd and Pt on the coated layer respectively, sintering the whole structure at 600° C. and then connecting the electrodes to leads which were in turn connected to a power source.

The obtained honeycomb heater having the integrally formed electrodes and catalyst was provided in advance of (upstream of) a three-way catalyst available on the market which was a main monolithic catalyst having an outer diameter of 90 mmφ and a length of 80 mm (a rib thickness of 6 mil and a passage density of 400 cells/in²).

The performance of this system at the beginning of the operation of an engine was tested by introducing into this system an exhaust gas whose temperature was raised at a same rate from 100° C. to 420° C. for two minutes and was then maintained at 420° C. for one minute (warming-up test) and by measuring the conversion for CO, HC and NOx. Table 1 shows the results of the measurements. At the beginning of the test, the honeycomb heater having the integrally formed electrodes and catalyst was energized for one minute by a battery of 12 V in order to heat the exhaust gas to 350° C.

Next, the durability test was conducted on the above system in the manner described below: the temperature of an exhaust gas was raised from the room temperatures to 750° C., and then maintained at 750° C. for ten hours. While the temperature was maintained at 750° C., a cyclic operation was repeated in which the engine was cruised for 60 seconds and then introduction of the fuel was cut for 5 seconds. At the beginning of the durability test, the honeycomb heater having the integrally formed electrodes and catalyst was energized for one minute in the same manner as that in which it was energized in the above measurements in order to heat the exhaust gas to 350° C.

After the above-described durability test was performed ten times, the state of the honeycomb heater having the integrally formed electrodes and catalyst was observed. No defect was found in the electrodes or in the vicinity thereof.

TABLE 1

| Average conversion (%) (warming-up test) | | |
|---|---|---|
| CO | HC | NOx |
| 63 | 50 | 63 |

As will be understood from the foregoing description, it is possible according to the present invention to efficiently and economically manufacture honeycomb heaters having the integrally formed electrodes whose honeycomb structure is not damaged and which exhibits excellent durability in high-temperature environments.

What is claimed is:

1. A honeycomb heater, comprising:
a metallic sintered honeycomb body; and
sintered metallic electrodes disposed at predetermined positions on said metallic honeycomb body, said metallic electrodes being made of the same material as that of said metallic honeycomb body or of a material having an electric resistance lower than that of the material comprising the metallic honeycomb body, wherein said metallic electrodes and said metallic honeycomb body have been simultaneously sintered.

2. The honeycomb heater of claim 1, wherein said metallic honeycomb body and said metallic electrodes are integrally formed and comprise one-piece.

3. A method of manufacturing a honeycomb heater having simultaneously sintered electrodes comprising the steps of:
preparing a formed metallic honeycomb body by forming metal powders into said formed metallic honeycomb body;
preparing metallic electrodes made of the same material as that of said formed metallic honeycomb body or of a material having an electric resistance lower than that of the material of the formed metallic honeycomb body;
joining said metallic electrodes to predetermined positions on said formed metallic honeycomb body; and
sintering simultaneously the formed metallic honeycomb body and the metallic electrodes joined thereto.

* * * * *